US 8,305,442 B2

(12) United States Patent
Millar

(10) Patent No.: US 8,305,442 B2
(45) Date of Patent: Nov. 6, 2012

(54) ENTRY CONTROL POINT DEVICE, SYSTEM AND METHOD

(75) Inventor: Christopher A. Millar, Reston, VA (US)

(73) Assignee: Gatekeeper, Inc., Reston, VA (US)

( * ) Notice: Subject to any disclaimer, the term of this patent is extended or adjusted under 35 U.S.C. 154(b) by 1406 days.

(21) Appl. No.: 11/981,027

(22) Filed: Oct. 31, 2007

(65) Prior Publication Data

US 2008/0239079 A1 Oct. 2, 2008

Related U.S. Application Data

(62) Division of application No. 11/360,758, filed on Feb. 23, 2006, now Pat. No. 7,349,007.

(60) Provisional application No. 60/655,321, filed on Feb. 23, 2005.

(51) Int. Cl.
*H04N 7/18* (2006.01)
*H04N 9/47* (2006.01)

(52) U.S. Cl. ........................................................ 348/148

(58) Field of Classification Search ...................... None
See application file for complete search history.

(56) References Cited

U.S. PATENT DOCUMENTS

| | | | |
|---|---|---|---|
| 4,288,819 A | 9/1981 | Williams | |
| 5,091,924 A | 2/1992 | Bermbach et al. | |
| 5,119,236 A | 6/1992 | Fong et al. | |
| 5,283,643 A | 2/1994 | Fujimoto | |
| 5,361,840 A | 11/1994 | Matthews | |
| 5,449,864 A | 9/1995 | Beatty et al. | |
| 6,856,344 B2 * | 2/2005 | Franz | 348/143 |
| 7,092,106 B2 * | 8/2006 | Cox et al. | 356/602 |
| 7,102,665 B1 | 9/2006 | Chandler et al. | |
| 7,132,653 B2 | 11/2006 | Faubion | |
| 8,067,719 B2 * | 11/2011 | Herrera et al. | 250/208.1 |
| 2003/0185340 A1 | 10/2003 | Frantz | |
| 2004/0165750 A1 | 8/2004 | Chew | |
| 2004/0199785 A1 | 10/2004 | Pederson | |

FOREIGN PATENT DOCUMENTS

| | | |
|---|---|---|
| GB | 9216178.5 | 2/1993 |
| JP | 2003348573 | 12/2003 |
| KR | 10-2005-0003664 | 1/2005 |
| WO | WO 01/46668 A | 6/2001 |

OTHER PUBLICATIONS

Dickson, Peter et al., "Mosaic Generation for Under Vehicle Inspection," Applications of Computer Vision, 2002. (WACV 2002), Piscataway, NJ, Dec. 3, 2002, pp. 251-256.
Supplementary European search report, annex and European search opinion for EP06736112.1 issued Mar. 26, 2008.
International Search Report and Written Opinion for PCT/US06/06708, dated Feb. 23, 2006.

* cited by examiner

*Primary Examiner* — Nhon Diep
(74) *Attorney, Agent, or Firm* — Williams Mullen PC; Thomas F. Bergert

(57) ABSTRACT

The present invention provides an entry control device, system and method which can recognize a vehicle by its undercarriage image only. The present invention compares a new vehicle undercarriage image with those stored in a reference database to facilitate the automatic search of a vehicle's undercarriage. The present invention can compare the new undercarriage image to the same or similar undercarriage image previously entered in the reference database, highlighting any anomalies such as, for example, foreign objects, explosives, drugs, paraphernalia and other illegal and/or harmful substances and devices.

4 Claims, 10 Drawing Sheets

ENTRY CONTROL POINT DEVICE, SYSTEM AND METHOD

REFERENCE TO RELATED APPLICATIONS

This application is a divisional application of, and claims priority under 35 U.S.C. 120 to U.S. non-provisional application Ser. No. 11/360,758, filed Feb. 23, 2006, now U.S. Pat. No. 7,349,007 entitled "Entry Control Point Device, System and Method" which claims the benefit of U.S. provisional patent application Ser. No. 60/655,321, filed Feb. 23, 2005 and entitled "Entry Control Point System and Method", the disclosure of which is incorporated herein by reference.

FIELD OF THE INVENTION

The present invention relates to access control and security, and more particularly to a device, system and method for scanning and analyzing the undersides of motor vehicles, and initiating responsive action as necessary.

BACKGROUND

Several technologies exist which can scan the underside of motor vehicles. Many of these technologies rely on the ability to link a vehicle with a vehicle identifier (e.g., license plate number, radio frequency identification (RFID) tag, etc.) so as to be able to perform an automated search of the underside. Other technologies produce only a single image requiring manual inspection of the vehicle image on a screen.

Of those systems that produce an image, the image is typically taken at just one angle (e.g., 90 degree to the horizontal), which allows foreign objects to be hidden in pockets or on cross members under the vehicle, for example. Further, the lighting is often inadequate in such systems to meet the requirements for quality high-resolution images, whether taken at night or during the day. Many such systems rely on ambient light to supplement whatever illumination is provided, and this frequently results in a high number of false positives. Further, many such systems require that a vehicle pass by at a very narrow speed range.

Regarding image storage and retrieval, current systems generally only record images via an archiving function. Where a vehicle identifier is used, an image may be called back from a local database, but not a central database in a networked configuration. Further, systems purporting to automatically detect foreign objects on vehicle undersides fail to show a direct regional comparison between the referenced/archived image and the new image, and do not highlight the targeted region for direct inspection.

There is thus a need for a system and method which resolves the above and other problems in order to provide foreign object detection capabilities and other access control and security benefits associated with vehicle underside detection.

SUMMARY OF THE PRESENT INVENTION

The present invention is a comprehensive under vehicle scanning device, system and method that can be deployed either in a mobile format (e.g., on a steel platform) or embedded in a road at an entry control point, for example. The present invention allows for the creation and storage of a database of reference images, one set of images (e.g., front and backward facing views) of each make and model of vehicle available, in order to permit automatic identification of a vehicle based on one or more newly detected vehicle images. The system achieves this by comparing newly detected images with those held in the reference database to identify the same or similar vehicle. In one embodiment, the present invention can identify a vehicle make and model by its image alone. Once identified, the system can run automatic comparisons between the two images (new and the reference images) to identify any anomalies such as the presence of foreign objects. Any anomalies are highlighted by the system for further analysis and potential action.

In one embodiment of the invention, an above-ground (e.g., front or rear view) vehicle image is also captured that the operator can then view on the screen. All images are recorded and held in one or more databases, are time and date stamped and can be recalled through a search feature. The present invention can also place vehicles on a watch list for subsequent monitoring.

In one embodiment of the present invention, a scanner configuration is provided for capturing two simultaneous views of the undercarriage. These simultaneous views or images can be taken from different directions and at different angles. For example, a first view or image can be taken looking forward in the same direction as the direction of the traveling vehicle, while a second view or image can be taken looking backward in the opposite direction of the traveling vehicle. The scanner configuration can include a camera, one or more mirror arrangements and one or more lighting arrangements to enhance lighting for accurate image recording. In one embodiment of the present invention, an ambient heat shield (AHS) and one or more ambient light shields (ALS) are employed to enhance the durability and reliability of the scanner configuration.

The present invention can be serviced via a network such as the Internet from anywhere in the world, and the system software and stored information can be downloaded, upgraded and maintained via a network such as the Internet.

DETAILED DESCRIPTION OF A PREFERRED EMBODIMENT

The present invention is a comprehensive under vehicle scanning device, system and method that can be deployed either in a mobile format (e.g., on a steel platform) or embedded in a road at an entry control point, for example. The present invention has utility in a variety of areas, including, for example, vehicle entry control for military field deployments, military bases, chemical areas, nuclear generation facilities, power stations, water reservoirs as well as general commercial environments.

Figure 1:
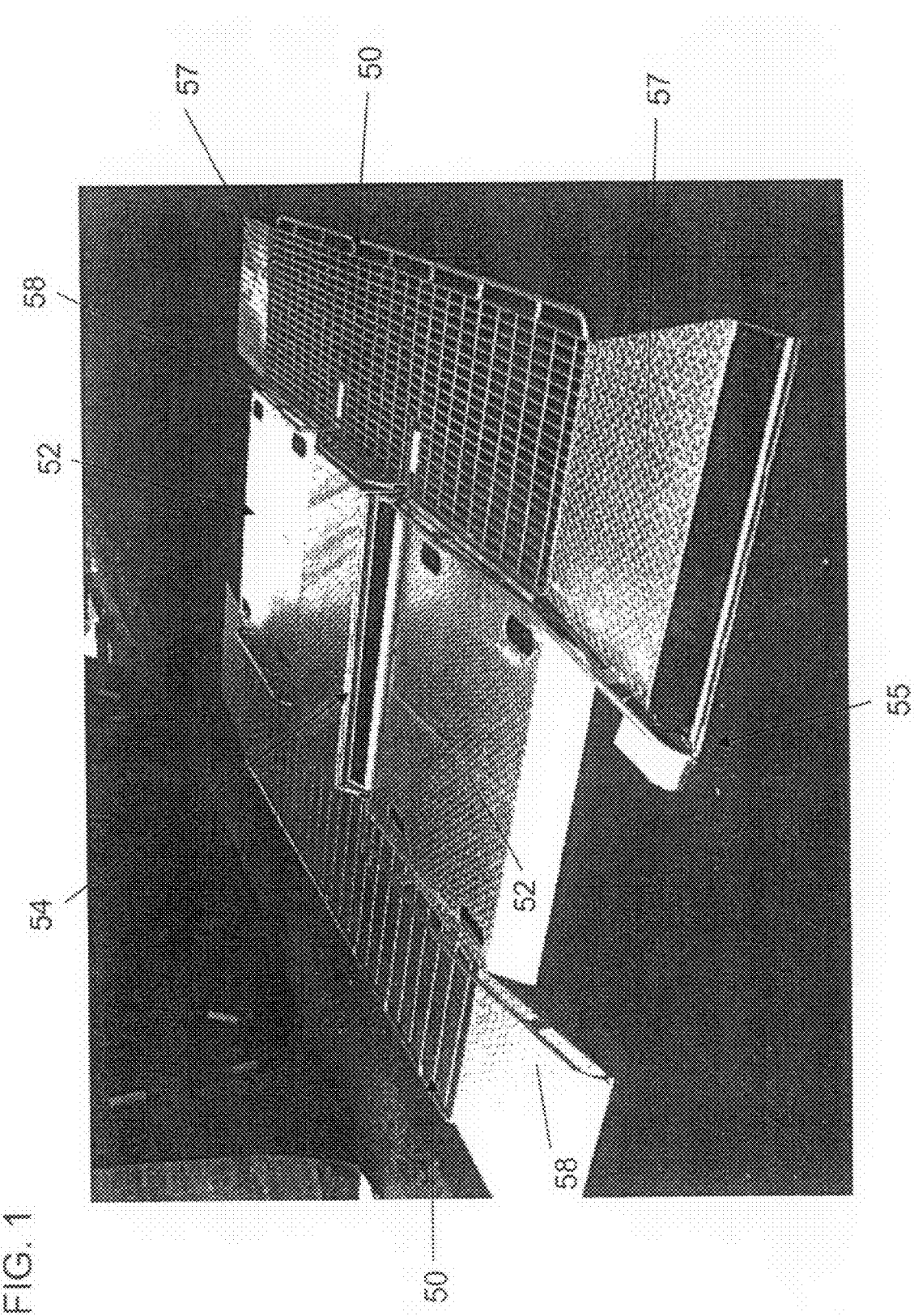
FIG. 1 is a photograph image of a perspective view of a mobile platform assembly incorporating one embodiment of the scanner configuration of the present invention.
Figure 2:
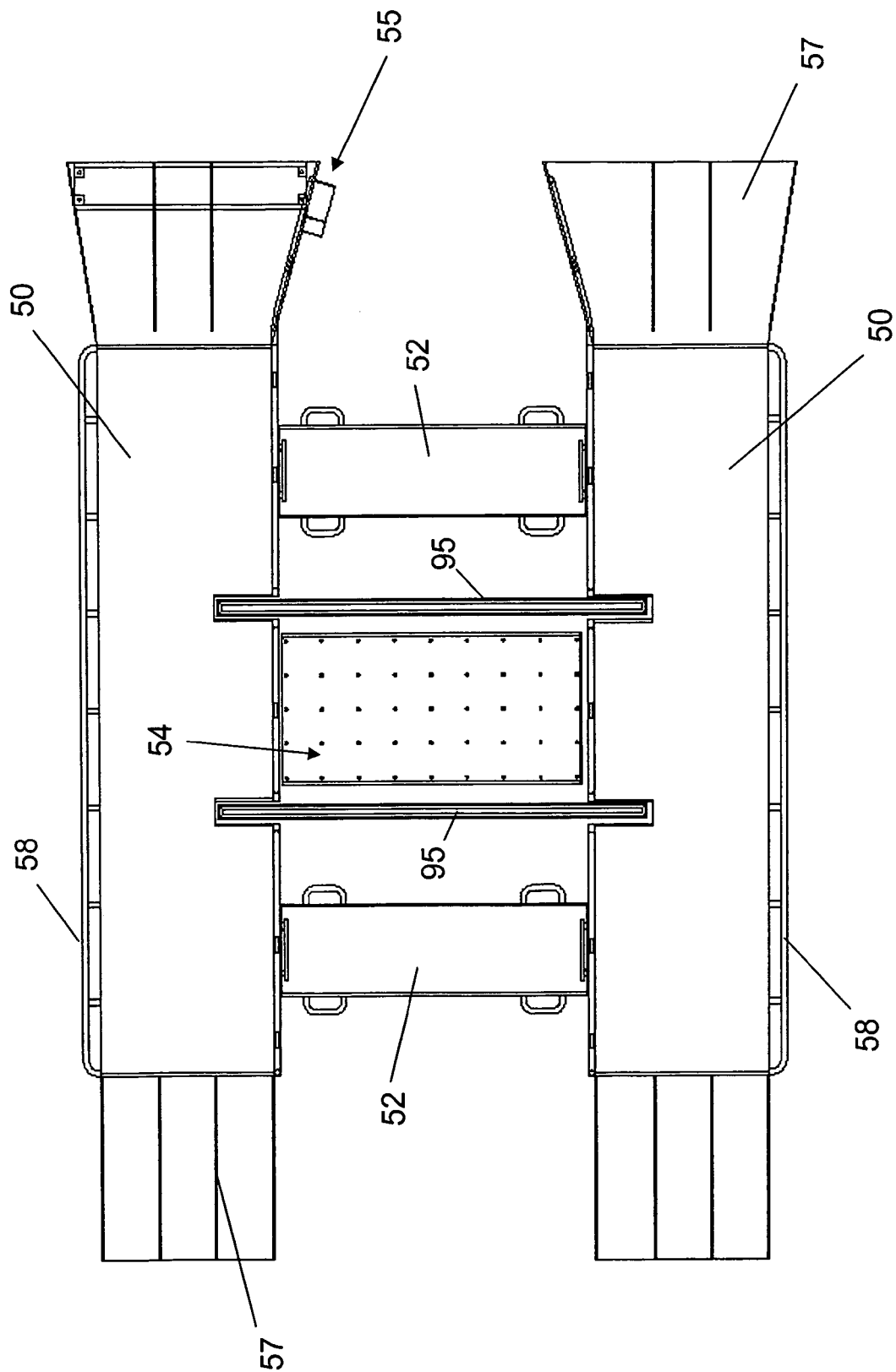
FIG. 2 is a top plan view of an alternative embodiment of the mobile platform assembly of FIG. 1.
Figure 3:
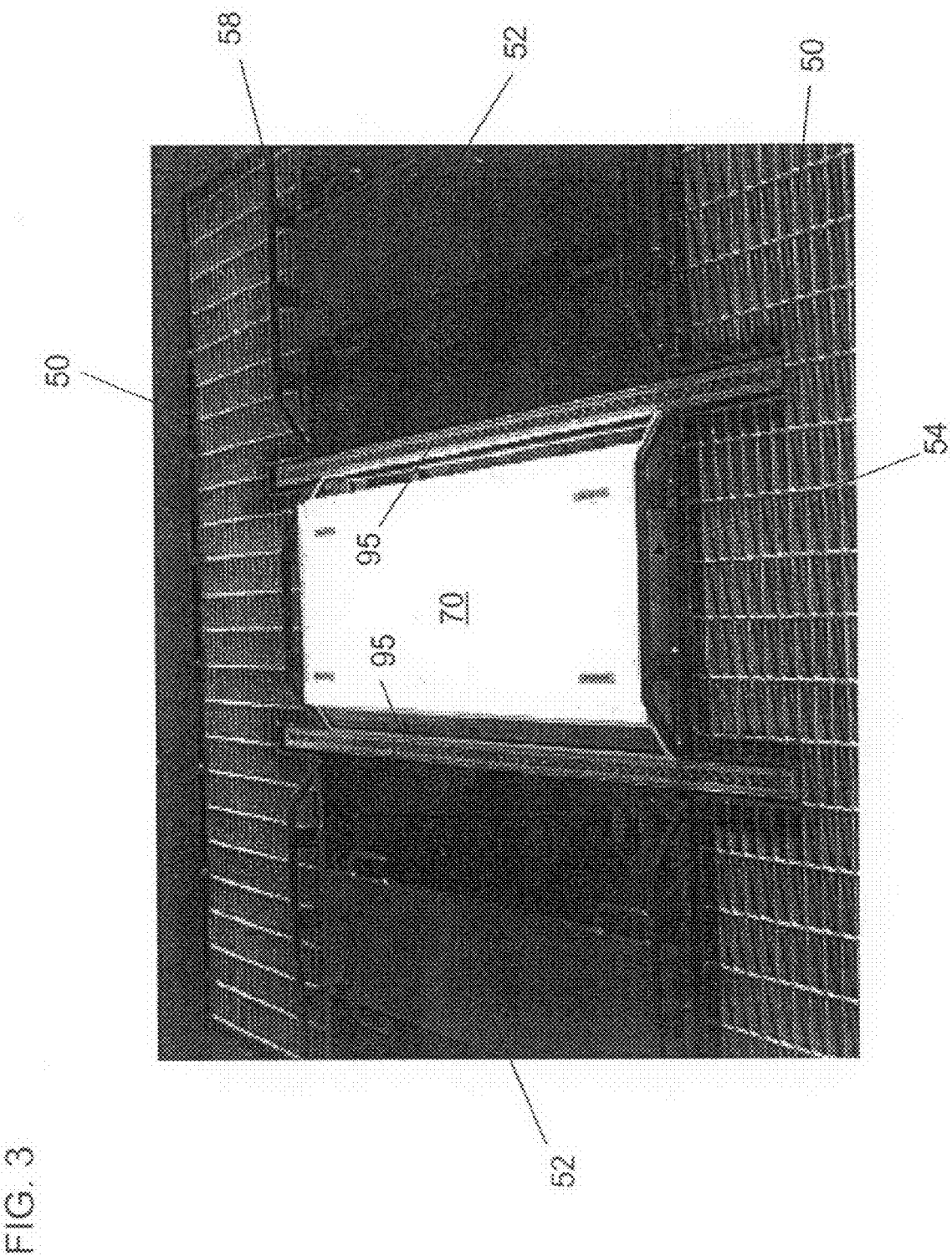
FIG. 3 is a photograph image of a side perspective view of the mobile platform assembly represented in FIG. 2.

As shown in FIGS. 1 through 3, the mobile implementation of the present invention can comprise the following elements: (a) two platform runners 50; (b) two cross members 52; (c) a scanner 54; (d) a proximity sensor 55; and (e) a front camera (not shown). In the "embedded" embodiment of the present invention, the platform runners and cross members may not be required, as the present invention can be embedded in the ground underneath any vehicle which may pass over. In the mobile platform embodiment as shown in FIGS. 1 and 3, the scanner 54 is positioned between the two platform runners and is maintained so as to avoid vibration and other negative consequences. In one embodiment of the present invention, the scanner is not mounted to any other portion of the invention.

In one embodiment of the present invention, the two runners 50 can be approximately twelve feet long by approximately two feet wide and approximately two inches high, for example, and made of steel (e.g., diamond plate ends and steel grating). The runners can have lead on and off ramps 57 as part of the runners overall length (e.g., twelve feet) that raise vehicles up from the flat ground to a certain height (e.g., approximately two inches) above the ground. On the leading edge of one of the runners (e.g., the right hand runner), a proximity sensor 55 can be provided. The sensor is activated by a pressure switch contained within a thick rubber strip, similar to those used at car washes, for example.

Guide rails 58 can also be provided to keep the vehicle profile as consistent as possible. It will be appreciated that the runners will be maintained in substantially parallel condition to facilitate vehicles passing over them. The two cross members 52 assist in this process by linking the two runners 50 together by interlocking connections, in one embodiment. Because vehicles can vary in width and dimensions between tires, the invention incorporates an algorithm which adjusts for vehicle profiles up to a particular distance, such as six inches, for example. In one embodiment, one of the runners can be provided with internal wiring that services a front camera and the proximity sensor. Internal wiring also provides power and CAT5E (network) connection between the external power supply and a system monitor, as described more completely below in connection with FIG. 8. Short power and CAT5E cables can run from scanner component of the present invention to the longer cables connecting the scanner component to the monitor of the present invention. The system is operable on both 24 DC (direct current) and 90 (60 Hz)-230 (50 Hz) volts AC (alternating current).

In one embodiment of the invention, the front (above-ground) camera is a day and night camera that can produce a (e.g., colored) picture of all vehicles as they enter the platform. In one embodiment of the present invention, the camera can be triggered by a pulse from the proximity sensor through a digital input/output element. Likewise, the main camera within the scanner can be triggered along with the LED lights when a vehicle crosses the proximity sensor, as described more completely hereinafter. In one embodiment of the present invention, the front above-ground camera is an NTSC or NTSC-compatible camera with a 4.3 mm built in lens, 420 TV lines resolution and with a shutter speed of $\frac{1}{50}$ ($\frac{1}{60}$)-$\frac{1}{100,000}$ sec. The front camera can operate using 12 V DC power at 120 mA, with an infrared wavelength of 850 nm and IR lamp irradiation of 15 m, for example.

Figure 4:
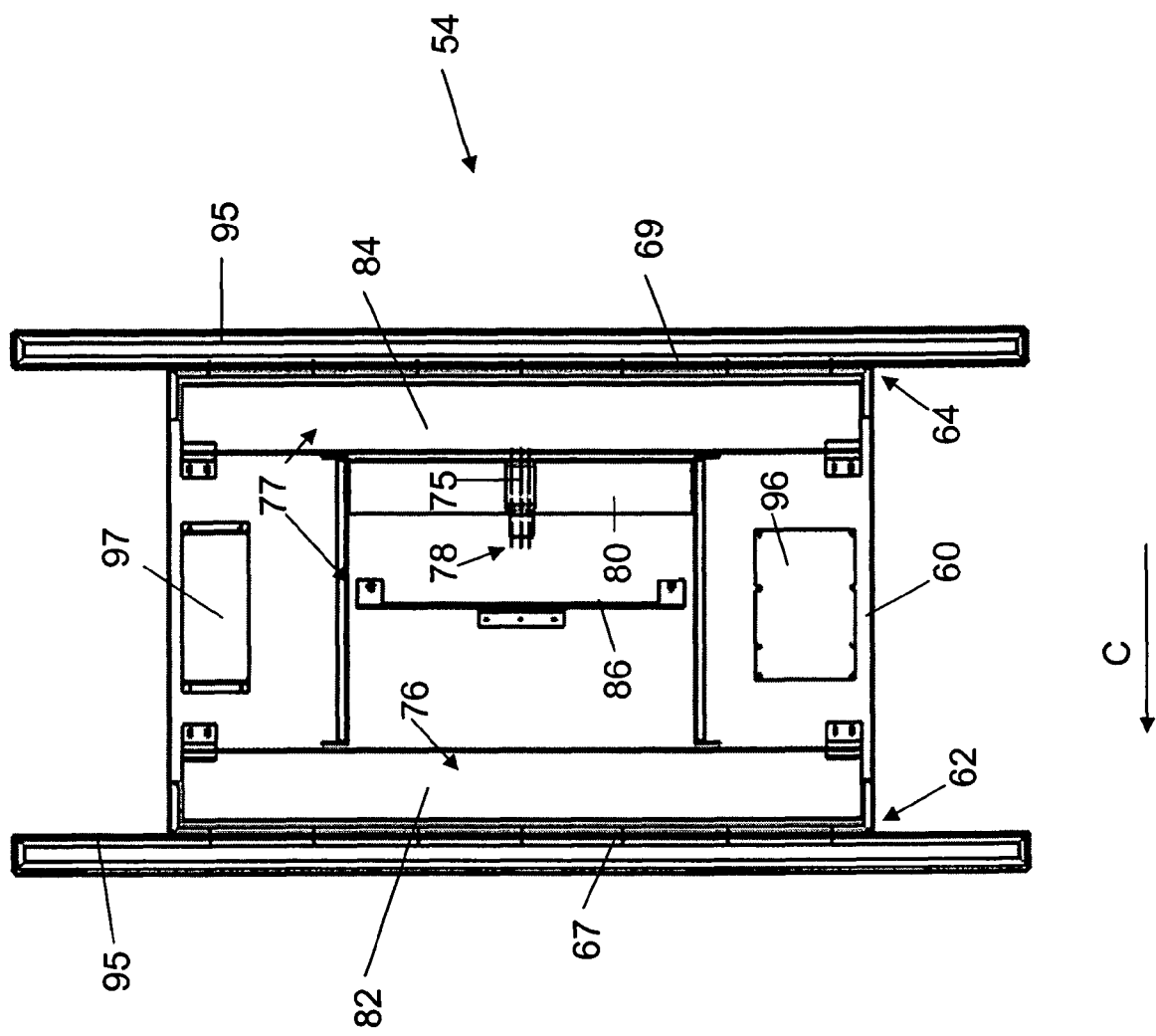
FIG. 4 is a top plan schematic views of one embodiment of the scanner configuration of the present invention, with the scanner top elements removed to reveal inner detail.
Figure 5:
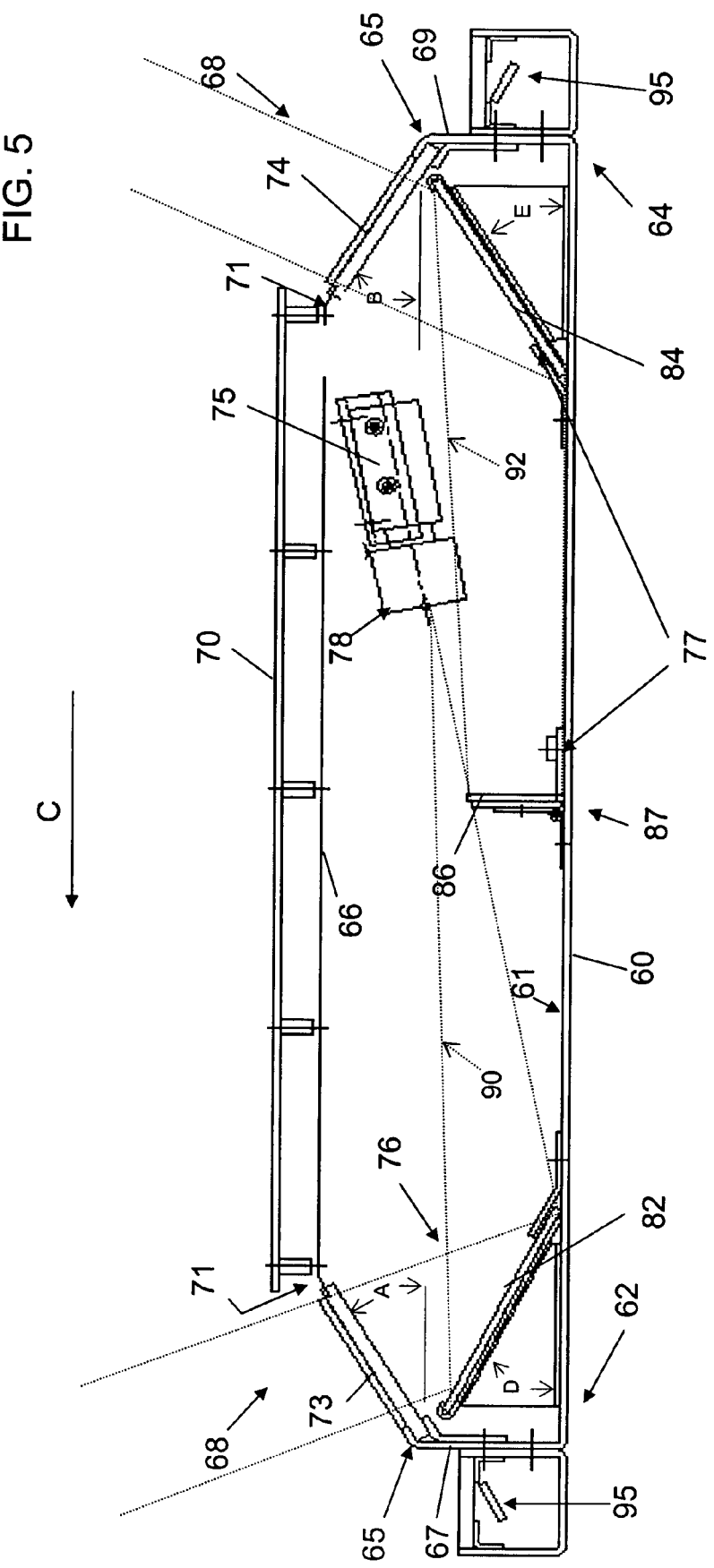
FIG. 5 is a side elevational schematic views of one embodiment of elements of the scanner configuration of the present invention, with a wall removed so as to reveal inner detail.

As shown in FIGS. 4 and 5, the scanner component 54 of the present invention includes a housing or framework 60 having a front end 62, a back end 64, a top surface 66, and openings 68 created between the top edge 65 of the front 67 and back 69 end walls and the respective side edges 71, 72 of the top surface 66. In one embodiment of the present invention, the scanner framework 54 is constructed of aluminum sheeting (e.g., approximately $\frac{1}{8}^{th}$ inch thick). In one embodiment of the present invention, as shown in FIG. 5, the present invention can further deploy an ambient heat shield (AHS) 70, which absorbs the direct heat from the sun and which may be positioned above the top cover of the scanner, for example. In one embodiment of the present invention, the AHS is positioned ½ inch above the scanner top cover, although this height can be reduced depending upon the implementation. The space between the top cover of the scanner component and the AHS creates airflow to move the heat away from the inner space of the scanner component.

Two windows 73, 74 can be securely positioned between the top surface 66 and the end walls 67, 69 in order to cover the respective openings while maintaining visibility therethrough. In one embodiment of the present invention, as shown in FIG. 5, the windows are secured at respective angles A and B to the horizontal. In a further embodiment of the present invention, the windows are made of anti-reflective, anti-glare glass and provided with a hydrophobic coating to provide water resistant and/or waterproof properties. In one embodiment of the present invention, hydrophobic glass can be provided with a reflective index of approximately 0.02%. As further shown in FIG. 5, a first window 73 is positioned to face forward (i.e., in the direction of travel of the overriding vehicle) and a second window 74 is positioned to face backward (i.e., against the direction of travel of the overriding vehicle) to assist in capturing two simultaneous views of the vehicle. The direction of travel of a given vehicle is indicated by arrow C in FIGS. 4 and 5. The windows can be secured to the framework using standard hardware as is known in the art.

As further shown in FIGS. 4 and 5, the scanner configuration of the present invention includes a camera 75 and first 76 and second 77 internal mirror arrangements, which can be angled such that internal mirrors 82 and 84 face out through the anti-reflective, anti-glare, water-repellant glass members.

In one embodiment of the present invention, the camera can be the Basler A602f wide area scan camera manufactured by Basler Vision Technology of Ahrensburg, Germany, capable of recording digital video images at a rate of at least 200 frames per second. The camera is provided with a lens 78 and can be secured to a beam 80 within the scanner framework. In one embodiment of the invention, the scanner camera is secured in a position that faces the direction C of oncoming travel of a vehicle, as shown in FIGS. 4 and 5. In another embodiment of the invention, the camera is secured in a position that faces the direction of outgoing travel of a vehicle across the platform. As shown in FIG. 5, the camera can be secured such that the lens faces at an angle downwardly away from the framework top surface 66 such that the camera is appropriately positioned to capture images reflected off of the first 76 and second 77 mirror arrangements. The present invention is thus distinguished from prior devices in which one or more cameras are faced directly upward. It is contemplated that the camera of the present invention can be oriented such that its lens faces either the front end or the back end of the framework. It is further contemplated that the camera of the present invention can be mounted to or near the framework bottom surface 61 and angled upwardly so as to record images reflected from mirror arrangements positioned above the camera (as opposed to below the camera as shown in FIGS. 4 and 5). The camera orientation also facilitates maintaining a low profile for the scanner configuration 54 of the present invention. If the camera were to be mounted facing directly up, ninety degrees from the horizontal, the profile of the device would be much higher, and the reliability of the images would be lower as described in more detail below. Further, the short distance between the camera and the overpassing vehicle (when the camera faces directly up) limits the breadth and accuracy of any images thus captured.

As further shown in FIG. 4, the first mirror arrangement indicated at 76 can be secured to the framework so as to provide a first reflecting surface angled upwardly toward the framework top surface 66 and toward the framework front end 62. The positioning of the first mirror arrangement enables the camera to record images reflected by the first mirror 82 as they appear on the other side of window member 73. The first mirror arrangement includes a first mirror secured at or near the scanner framework front end. In one embodiment of the invention, as shown in FIGS. 4 and 5, the first mirror is secured inside the front wall 67 of the scanner framework and below the front window 73. The mirror can be secured using a mirror support element and a mirror clip element, as will be understood to those of ordinary skill in the art of mounting mirrors.

In a similar manner, the second mirror arrangement, indicated at 77, can be secured to the framework so as to provide a second reflecting surface angled upwardly in a direction facing the framework top surface 66 and the framework back end 64. The positioning of the second mirror arrangement 77 enables the camera 75 to record images reflected by the second mirror arrangement as they appear on the other side of window member 74. The second mirror arrangement 77 can include a larger primary mirror 84 mounted at or near the framework back end 64 and a smaller secondary mirror 86 mounted at a location 87 in between the front 62 and back 64 ends of the scanner framework. As shown in FIG. 5, the primary mirror 84 of the second mirror arrangement 77 is secured inside the back wall 64 of the framework and underneath the back window member 74. In one embodiment of the present invention, the secondary mirror 86 of the second mirror arrangement 77 can be positioned roughly halfway between the scanner framework front 62 and end 64 walls, and can be secured in a substantially perpendicular relation to the framework bottom floor 61.

In one embodiment, each large mirror 82, 84 is approximately thirty-six inches long and approximately four inches high and the smaller mirror 86 is approximately twelve inches long and approximately one inch high. In one embodiment of the invention, the small mirror is placed approximately three and one-half inches in front of the camera 75 to assist in reflecting light appropriately against large mirror 84. The mirrors 82 and 84 can be angled so as to maximize the likelihood of obtaining reliable images. In one embodiment of the present invention, mirror 82 is secured at an angle D of between approximately 20 and 30 degrees from the horizontal, and mirror 84 is secured at an angle E of between approximately 25 and 35 degrees from the horizontal. These angles have been determined to be optimal for image capture and quality assurance so as to avoid poor images or false positives according to the systems, devices and methods of the present invention. These angles have also been determined to match well with the angle at which the scanner camera is positioned within the device of the present invention, in order to provide a device with a low profile for convenience of operation. In spite of the approximate angles above, the invention contemplates changing these angles to accommodate different environments or vehicles, for example.

As shown in FIGS. 4 and 5, the scanner configuration including the camera and first and second mirror arrangements allows the device of the present invention to operate such that the camera can detect multiple images from an overriding vehicle at the same time. The top half of the camera lens looks over the small mirror 86 on to the front mirror 82. The bottom half of the camera lens looks onto the small mirror 86 that captures the view reflected by the back main mirror 84. A first view is taken of the vehicle as it approaches wall 69 as shown by the dashed lines 92. In this view, the camera is recording the image of the vehicle as reflected by the back mirror 84 at the back end of the scanner framework looking toward the back of the vehicle via the smaller mirror 86. A second view is simultaneously recorded by the camera as it is reflected from the first mirror arrangement as indicated in dashed lines at 90.

It will be appreciated that the present invention can capture the desired forward facing and rearward facing views using other camera and mirror arrangements. In one embodiment of the invention, two cameras are employed wherein a first camera faces upwardly at an angle similar to that of first window and a second camera faces upwardly at an angle similar to that of second window. In order to obtain greater distance from the camera lens to the vehicle underbody, two cameras can also be employed in an arrangement with two mirror arrangements similar to that described above. In this embodiment, however, the first camera would be reflected off of the first mirror arrangement similar to that described above, while the second camera would be positioned near the first camera and reflected off of the primary mirror of the second mirror arrangement. In this embodiment, there would be no secondary mirror of the second mirror arrangement and the positioning of the second camera and the primary mirror of the second arrangement would possibly require adjustment over that described above in order to capture images at the appropriate angle for use in connection with the present invention.

The ability to capture simultaneous images from different angles provides a significant advantage over prior devices. As a first matter, capturing the simultaneous images from different angles provides a more robust database of reference images as significantly more details are captured, thereby enabling enhanced and more accurate later comparisons of field data. Secondly, capturing the simultaneous images from different angles provides an opportunity to better capture images detailing areas where explosives, contraband and other foreign objects may be hidden. Thirdly, capturing simultaneous images from different angles improves the likelihood of making a successful match with the similar stored images, thereby increasing the reliability of the system results and entry control functions. It will be appreciated that simultaneous can mean the identical instant in time, or the near-identical instant in time.

As shown in FIGS. 2, 3, and 4, the scanner configuration of the present invention can also include two lighting rails 95. In one embodiment, these rails are secured to the scanner frame, one at each end. As shown in FIG. 4, the lighting rails are secured to the outside of respective front 67 and end 69 walls of the framework. The lighting rails each include, in one embodiment, sixty red LEDs (120 in total) and the LEDs can be angled in such a direction so as to closely match the angle at which the images are recorded through respective glass windows. In one embodiment of the invention, the lighting rail LEDs are angled at approximately 25 degrees from the horizontal (e.g., scanner framework base). In one embodiment, the lights can be housed in an aluminum casing which can be approximately two inches by two inches by sixty inches long covered in plexiglass, for example. In another embodiment of the present invention, the lighting can be in the form of a dense LED array with significantly more LEDs in a printed circuit board arrangement, for example.

In one embodiment of the present invention, ambient light shields (ALS) can be deployed comprising a white opaque material on aluminum framing that can stand alongside other elements of the present invention, for example. In this way, the ALS can significantly block ambient light from the scanner during daytime operations, while reflecting light during night operations to assist in illuminating the outer edge of the vehicle crossing the scanner component of the present invention by reflecting back the light produced from the lighting strips. In another aspect of the present invention, components of the present invention (e.g., scanner component with lighting rails) can be sealed from the weather elements (e.g., dust, precipitation, wind).

As shown in FIGS. 3 and 5, an ambient heat shield 70 (AHS) can be provided on top of the scanner device and, in one embodiment, the AHS is supported approximately ½ inch above the top cover of the scanner. This structure allows for airflow to take any access heat away from the top of the scanner. The shield can also be made of $\frac{1}{8}^{th}$ inch aluminum, for example.

In one embodiment of the present invention, the scanner 54 can contain several electronic components, including, for example, a single board computer (SBC) 96, one or more power supplies 97, the camera 75, a digital input/output device (DIO), a frame grabber, and one or more power pucks (to regulate lighting power). The SBC 96, power supply 97 and other elements can be mounted to the framework using standard hardware as is known in the art. In one embodiment of the invention, the SBC has associated programming and logic that can operate so as to stitch frames taken from the multiple views into two individual images for comparison with reference images. For example, when a vehicle passes over the device and images are recorded by the wide scan camera, a forward looking image and a rearward looking image can be produced using software programming associated with the present invention such that the image frames are "stitched" together. In this way, two images are produced—a first image is produced by stitching together the recorded frames in the forward facing view, and the second image is produced by stitching together the recorded frames in the rearward facing view. The present invention stitches frames in a way that distinguishes over prior devices which might incorporate "line stitching" of images as described more completely below.

In one embodiment of the present invention, the scanner SBC can comprise dual redundant SBCs using, for example, Intel™ 1.6 GHz P4 mobile processors and 1 GB of SDRAM, wherein each SBC is provided with 2 RS-232 ports, 4 USB ports, 2 10/100 Ethernet ports, a CompactFlash socket, a PCMCIA socket and dual IEEE 1394A (Firewire) interfaces. Such an implementation will be appreciated as an example implementation and the system is capable of working equally well with different or substitute elements. The scanner can also be provided with a digital I/O interface as described that provides the control interface to the scanner camera, lighting system, traffic light and proximity sensor. The scanner camera controller can be provided with the Microsoft Windows™ Embedded XP Compact Flash operating system, for example, and the scanner subsystems can be connected via a 10/100 Base T Ethernet up to a 1000 Base T Ethernet communications bus in one embodiment of the present invention.

Figure 6:
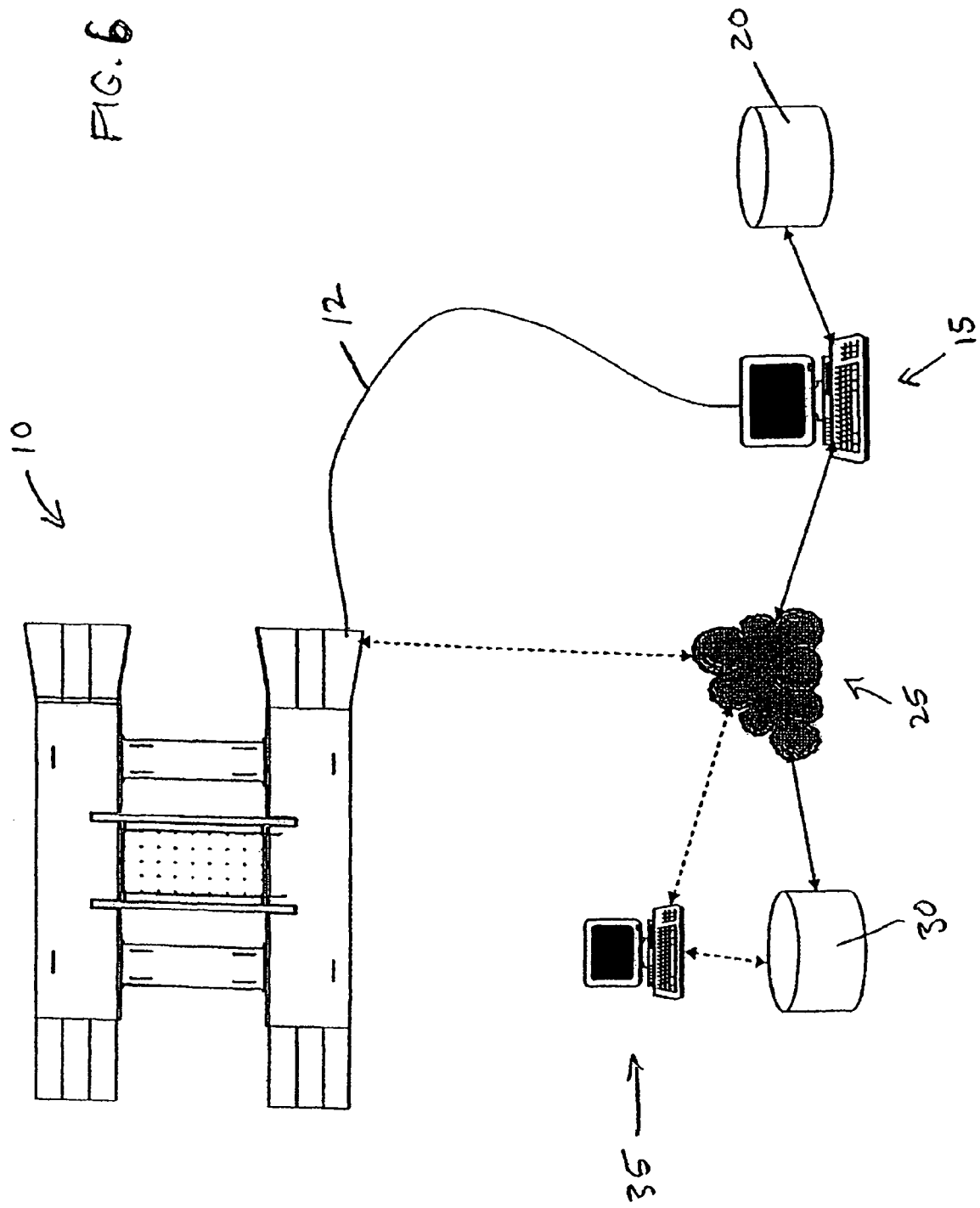
FIG. 6 is a schematic representation of an entry control system incorporating the mobile platform and scanner configuration in accordance with one embodiment of the present invention.

As shown in FIG. 6, the present invention can be implemented as part of an entry control system, including an entry control platform and scanner device as described above (shown generally at 10) and a computer/monitor element 15. Computer and monitor 15 can access a database 20, which can be locally stored on the computer 15 or accessible via a network. Computer 15 can also be connected to a wide area network 25 such as the Internet, for example, in order to access a different database 30 for use with the present invention. This database 30 can be used to store and update reference images for vehicles of all types, and may be used to update local database 20, in one embodiment of the invention. Reference images can be "stock" images of vehicle undersides made available by vehicle manufacturers, dealers or service providers, for example. Alternatively, reference images can be images created using the system, device and methods of the present invention. It will be appreciated that the effectiveness of the present invention can be increased when using reference images created using the present invention, due to the increased accuracy and comprehensive detail available using the present invention.

A separate computer 35 is shown, which may be a remote computer not located near the physical entry control deployment elements 10. Thus, the present invention can receive communications from the scanner component while being operated either locally at computer 15 or remotely at computer 35. It will be appreciated that computer and monitor 15 may be considered remote even when located at the implementation site, since they may be connected to elements 10 via Ethernet or fiber cabling 12, for example, or via wireless communication at a distance of, for example, 100 meters or more from the elements 10. Maintaining such a distance is an added precautionary benefit afforded to users of the present invention, limiting risk of human injury or computer system damage in the case of explosives being detonated or other hazardous materials being exposed at the location of elements 10.

The monitor (shown generally in FIG. 6 with computer as 15) can contain several components: a single board computer (SBC); a power supply; and a One Touch Screen controller. In one embodiment of the present invention, the monitor can be in an aluminum casing with an opening at the front to expose the touch screen, and an opening at the back to expose small plugs for CAT5E (network cabling), power, server connection and two USB ports, for example. The monitor can also be provided with a cover specifically designed to act both as a cover for the screen during transportation and as a stand during operations. The cover slides up through slots on the side of the cover and then slides down the back of the monitor and screw knobs hold the cover in position for both transportation and operations. The monitor can further be provided with a carrier handle for ease of transportation. In one embodiment, the monitor's screen is an 18.5" "Near Field Imaging Capacitive Touch Screen" (up to welding glove sensitivity) with Enhanced Specula Reflector (ESR). The ESR film reflects approximately 5% of the ambient light back through the LCD.

The touch screen can be operated by touching the screen with a bare finger or even less sensitive items all the way up to a welder's glove, for example. The screen configuration caters to a number of issues relevant to the operation of the invention. For example, the touch screen interface is intuitive (i.e., one can see it, touch it), it is readable in day light, and it allows operators to keep gloves on in hot and cold conditions. Sample screen shots associated with the present invention are shown in FIGS. 7 through 9.

Figure 7:
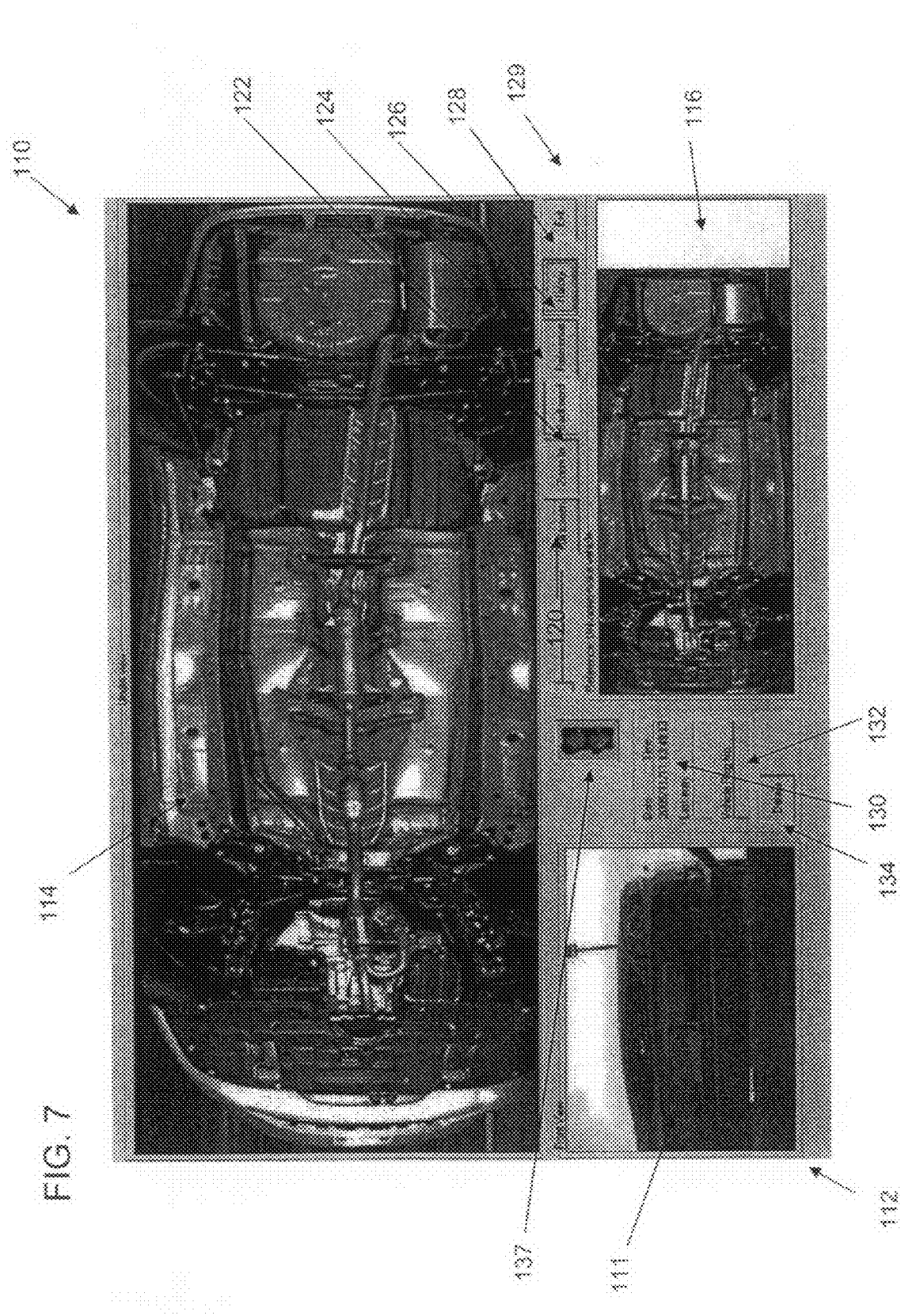
FIGS. 7 through 9 are example screen displays associated with a monitor interface incorporated in one embodiment of the present invention.
Figure 8:
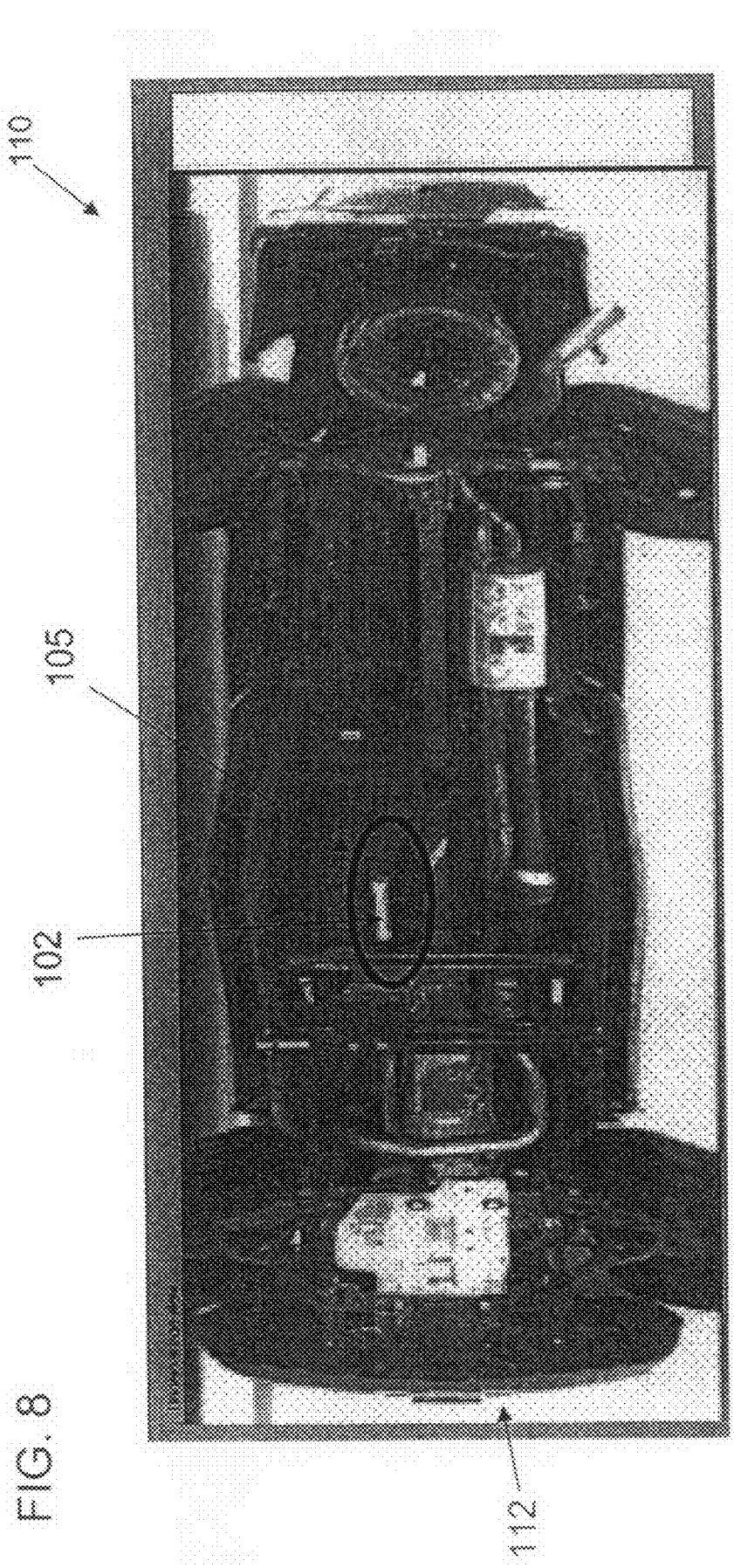
Figure 9:
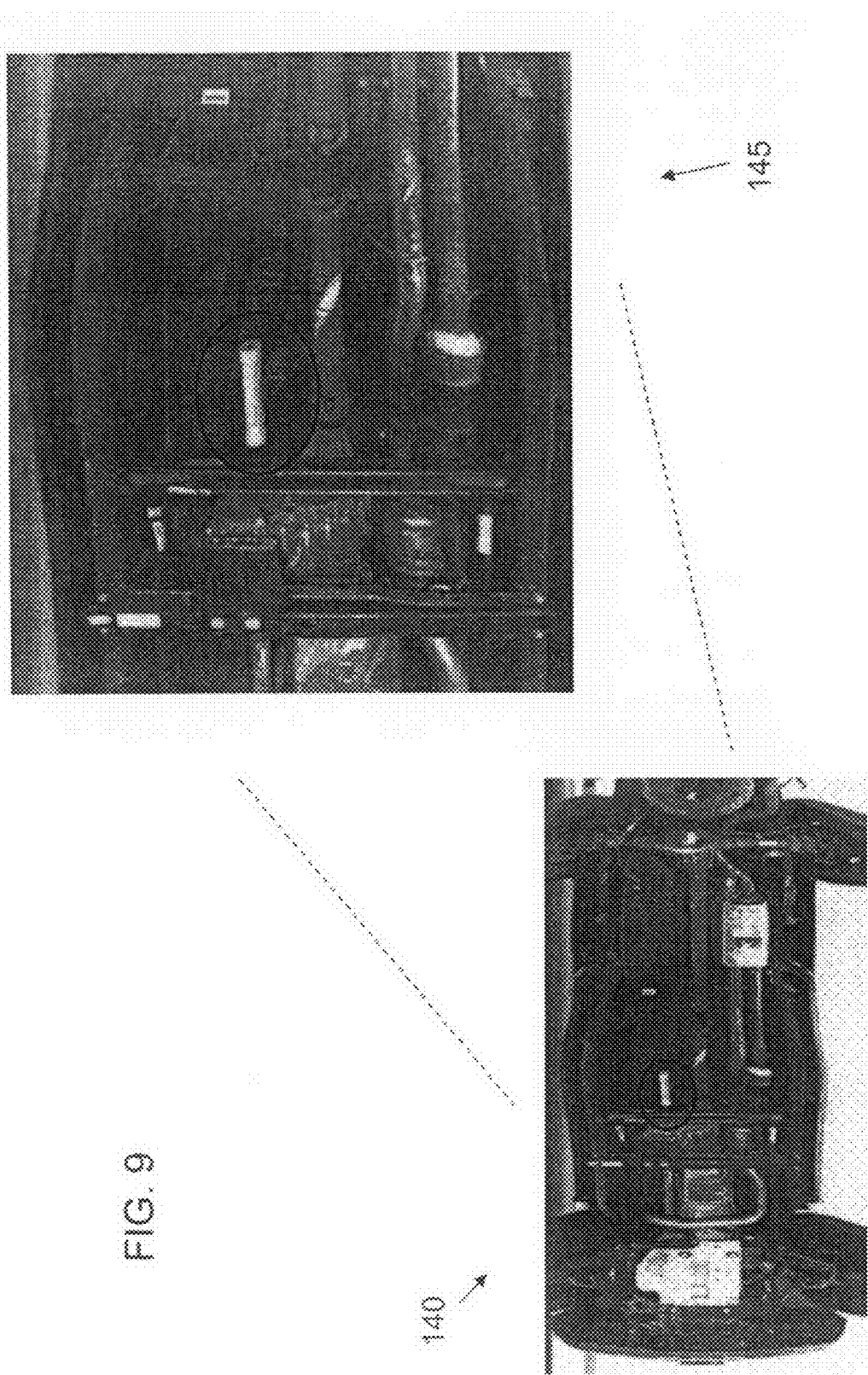

FIGS. 7 through 9 show sample screen images of what might appear on the monitor during operation of the present invention. As shown in FIG. 7, a portion of the interface 110 can display an above ground image 112 of the oncoming vehicle 111. Another portion of the interface can show the stitched image 114 representing one of the two simultaneous undercarriage images captured by the camera as the vehicle moved across the platform and/or scanner configuration. In one embodiment of the invention, the two images appear on screen at the same time, while in another embodiment as shown in FIG. 7, either the forward facing or rearward facing image appears with an appropriate input selector available to toggle between views. Another portion of the interface can show a previously stored reference image 116 for comparing with image 114. Various interface buttons are shown which allow the user to show a full screen image 120, zoom 122, toggle the view between forward and backward image 124, reference image 126, show the history 128 and exit 129 the system. Additionally, the user can conduct file operations such as saving the screen image, noting the date/time 130, noting the license plate 132 and reviewing/editing other details 134. The user can also view and/or control the traffic light associated with the system of the present invention as described in more detail below, using input element 137.

As shown in FIG. 8, any discrepancies 102 located in the field image 112 can be highlighted such as by being circled (in a color such as red, for example), as indicated by reference numeral 105, for example. In one embodiment of the invention, as represented in FIG. 9, operators can touch the red circle on the original screen display 140 to zoom in to the identified discrepancy in a zoomed image display 145. At the same time, the identical position on the reference image can be centered in the reference image box on screen 116, thereby allowing for immediate comparison with a reference vehicle undercarriage. Anomalies might include, for example, foreign objects, explosives, drugs, paraphernalia and other illegal and/or harmful substances and devices.

The front view display of the vehicle 111 can be used to read license plates and other externally identifiable indicia, which may then be entered into the system through a pop-up soft key pad on the screen, for example. The screen functions allow for full screen views of the current image and an ability to toggle between front and backward looking views of the undercarriage. The present invention can further use RFID, license plate number readers and other electronic forms of identification (vehicle identifiers) to link vehicle images directly to a specific vehicle. In this way, the present invention can recall the vehicle undercarriage at later times, such as when the vehicle returns over the detection element of the present invention to then perform an automatic search of the vehicle. In one embodiment of the present invention, the primary form of recognition is the image of the vehicle undercarriage itself in a similar fashion to the way a finger print reader recognizes a person by their fingerprint, for example.

The present invention thus provides an entry control system that comprises the scanner configuration in communication with the computer and monitor so as to detect vehicles whose undersides may exhibit features that the system detects as anomalies. The computer can access the system database, which holds details of vehicle undercarriage images categorized by at least one identifier, such as, for example, the vehicle make, model, year, license plate, license number, vehicle identification number (VIN), RFID tag and/or vehicle owner information. The computer can further include programming for comparing field image data obtained against the images in the database.

The present invention further retains both reference and archived images on either a local or central database and can access the images through a network configuration. Vehicles returning over the system at any point within the network can be compared automatically to their previous image (for example, if license plate number or RFID reader deployed) or to a same or similar vehicle make and model image through the reference database. In one embodiment of the present invention, the reference database comprises in part the previously identified vehicle makes and models.

In one embodiment of the invention, the vehicle image history can also be displayed by touching the "history" button, at which time a calendar will be displayed, inviting the operator to pick a date to review images that are register by date and time stamp. A further feature activated through the screen is the search feature where a particular vehicle number plate can be entered and that vehicle's history will be displayed on screen, listing the date and time of all visits by that vehicle to that particular scanner (entry control point). In a networked situation it would also show the date and time that vehicle entered other control points within a control point network.

Operations

In installation of the present invention, calibration programming can be provided for calibrating the scanner camera in combination with the mirror arrangements described. By calibrating the camera such that it captures only mirror-reflected images and no ancillary details, the reliability and detail of the captured images are significantly improved. Once the system has been successfully installed, it is ready to record images.

As a vehicle crosses the proximity sensor, the front camera takes a picture of the front of the vehicle, the system lights turn on, the main scanner camera starts its operation and the traffic light turns from green to red. The camera upon triggering is looking for movement in the background. The camera communicates with the scanner SBC, which also communicates with the monitor as described. Once the camera senses movement, it begins the stitching process of compiling two complete images of the vehicle crossing over the scanner. The two images are produced from the video views seen and recorded through the two main mirrors. The stitched images, along with the picture of the front of the vehicle, are transferred to the monitor via the CAT5E cable, fiber or wireless means as known in the art, if available. Part of the scanner SBC's role is to compile the two images and to communicate with the DIO to control the red LEDs and traffic light(s). Upon compiling the two images, the scanner SBC can communicate the images in addition to the above ground camera image to the monitor.

If the system of the present invention is being used to initiate collection and storage of reference images in the database for a given vehicle, then the system will store the acquired images. In one embodiment of the invention, the system of the present invention will store information regarding the vehicle's make, model, year and transmission type (e.g., standard (i.e., manual) or automatic). It will be appreciated that the scanner configuration of the present invention allows the system of the present invention to collect and store identifying details such as, for example, the vehicle's exhaust layout, drive shafts, axle configuration, catalytic converter, muffler(s), fuel tank(s), spare tire position, and trunk configuration. Prior to the storing of collected reference images, the system of the present invention contains programming which allows a user monitoring the data collection to appropriately trim or crop images. In one embodiment of the present invention, when a new undercarriage image is being input into the reference database, a box can appear on the user interface containing the view of the vehicle undercarriage. The image can be provided with four (e.g., red) lines surrounding it to allow the operator to trim or crop undesirable background material. By appropriately cropping images prior to entry into the reference database, the present invention significantly reduces the possibility of false positive matches in the future. In one embodiment, as an operator touches or clicks on each red line, the active line becomes green or another color, which signifies to the user that it is the active line capable of current manipulation. When the operator has completed the cropping process for the front view of the vehicle, the system presents the back view image and the operation can be repeated.

It will be appreciated that the database of the present invention is of significant size to support the largest possible operations. In one embodiment of the present invention, the database is at least 80 Gigabytes in size and is capable of storing more than 250,000 high quality digital images. A given vehicle's history is also available for retrieval on demand, including profile information, image information and traffic history. In one embodiment of the present invention, an operator can place a vehicle on a watch list, such that when that vehicle is detected by a vehicle detection system in communication with the present invention, an alert is signaled and appropriately communicated.

If the system of the present invention is being used with field collected data, then once the SBC within the monitor receives the images of the under vehicle, it searches the reference database for the same or similar image(s). In one embodiment of the present invention, the system includes software, hardware and/or a combination of the two that analyzes the field images transmitted by the scanner SBC. The image views (front facing and rearward facing) are analyzed as a complete pattern and the system searches the reference database using this complete pattern. In one embodiment of the present invention, the system has a user defined threshold for identifying the same or similar vehicles and only images that exceed this threshold are reviewed. In one embodiment of the present invention, the threshold is set at 70%, which means that the system of the present invention will only review vehicle images that exceed 70% similarities with the newly scanned vehicle. In a further embodiment of the present invention, once the system has identified all vehicles that exceed 70% similarities, the system of the present invention will only display information regarding the vehicle with the greatest percentage or level of similarity above the established threshold.

If the system of the present invention finds a same or similar image or images to the field collected image(s), the system will perform a match of the two images to highlight any differences and will display the same. In one embodiment of the present invention, results are displayed on the monitor within a total processing time of four seconds or less from the time the images are first received from the scanner camera. In one embodiment, the system of the present invention has a sensitivity setting for both the degree of same or similar vehicle and the level of sensitivity of the foreign object detection. In one embodiment of the invention, when the system identifies changes between collected images from the field and previously stored reference images, the system will sound an audible alarm (in addition to generating a red ring around the anomaly, for example). Thus, once field images are obtained, the system of the present invention uses the stitched images to compare them with stored images from the reference database. For the most closely matching images meeting the pre-established threshold level, the system will return the make and model of the given vehicle. Additionally, once the most closely similar vehicle make and model is established, the system of the present invention will compare the newly captured images with the referenced images to determine whether a foreign object or other anomaly is present.

It will be appreciated that the system of the present invention is far less sensitive to the speed of the passing vehicle than systems that employ line scanning. In area scan cameras, a CCD (charge-coupled device) matrix (typically rectangular in form) of pixels provides a view of an object that contains both length and width. The width is typically less than or equal to 1300 pixels and the length is determined by the camera's frame rate. With a line scan camera, the CCD contains only a single row of pixels. This almost one-dimensional image usually requires that the object be moved and that a series of pictures be taken to provide useful data for an inspection. Line scan cameras typically provide for fast scanning of the pixels so that many pictures can be taken over a short period of time as the object moves in the field of view of the camera. However, a significant problem with line scanning technology as it is applied to under vehicle inspection is that the performance of a line scanner is dependent on controlling the speed of the vehicle. A line scanner scans in very thin, one-dimensional lines that are laid together to form a two dimensional view. However, if the object (vehicle) being scanned moves too quickly or too slowly for the line scanner, the results will vary. Thus, if, while the scanner is recording a line of view, the vehicle moves faster than the rate at which the line scanner is operating, the scanner will miss part of the vehicle undercarriage, resulting in a "short" appearing vehicle. Conversely, if the vehicle is moving slower than the scanner, it will double up on the lines recorded resulting in a longer-appearing vehicle. Line scanning under-vehicle technology is thus inferior in attempting to perform automatic matching, as it is virtually impossible to have a vehicle drive over a scanner at the exact same speed each time and at the required speed of the line scanning camera.

In the present invention, the area scan camera's rectangle of pixels (CCD Matrix) provides the system with the ability to stitch overlapping CCD Matrixes based on the overlapping pixels within the Matrix. As the camera operates at 200 frames per second, many frames are provided to the system to stitch frames based on pixel matching. The frame rate of the camera provides greater length to the matrix that in turn allows for greater flexibility in speed of a vehicle crossing the scanner, as the system has longer matrices (providing greater opportunity for overlap) by which to collect the required pixels to build the composite images.

The sensitivity of same or similar vehicle is on a scale of 0-100 where 100 is looking for the exact same vehicle and 0 is for the vehicle with the least number of similar reference points. In one embodiment, if the system is set to 100, the system would not be able to detect foreign objects. This is because the system would be looking for a vehicle that has the same foreign object both in size and position on the vehicle. A lesser setting is recommended for this reason. The sensitivity setting for foreign object detection ranges from 0-100. The higher the level of sensitivity, the higher the level of differences the system will detect or the smaller the foreign object the system will detect.

It will be appreciated that the ambient light shields (ALSs) reduce the level of ambient light that the scanner is exposed to. By reducing the level of ambient light, the system is better able to complete searches at a higher sensitivity level without a number of ambient light differences (false positives) being detected by the system as well.

Figure 10:
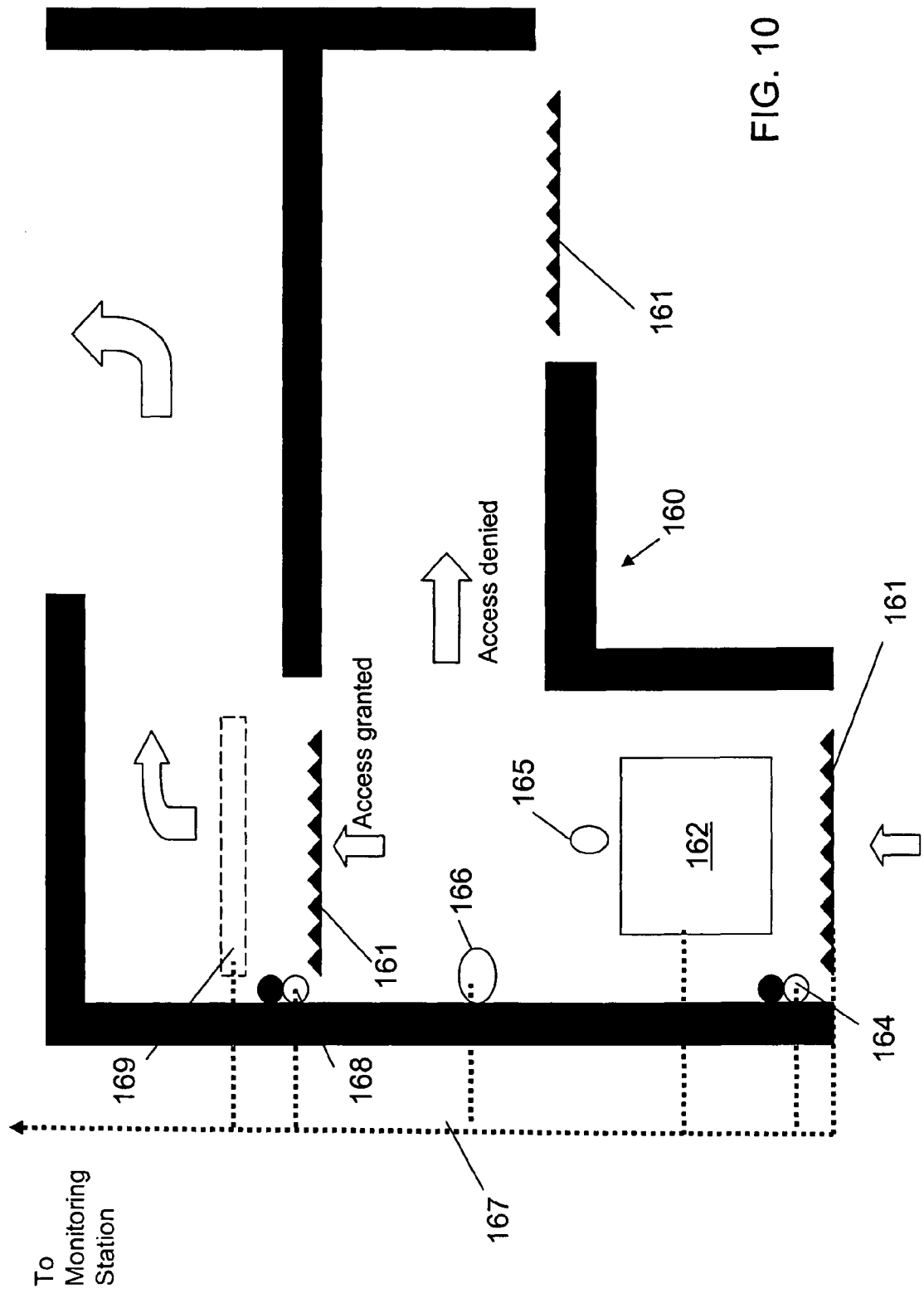
FIG. 10 is an exemplary schematic layout of an entry control system in accordance with one aspect of the present invention.

In a further embodiment of the present invention, a gatepost component is provided as an additional, remotely managed, above ground system to assist in inspecting vehicles and their occupants prior to allowing entry or access to a restricted area. An example schematic layout of a potential entry control system incorporating the gatepost of the present invention is shown in FIG. 10. As shown therein, a set of barrier walls 160 can be placed to channel vehicle traffic into and/or over the entry control point system of the present invention and its components. In one aspect, auto road spikes or one way spikes can be placed at various locations within the system as at 161 to dissuade drivers from attempting to reverse directions. The direction of vehicle travel is indicated by the arrows, with different directions shown based on the outcome of inspecting the vehicle. The scanner component of the present invention is indicated generally at 162 and it will be appreciated that this implementation can be either embedded or with runners as previously described. A first traffic light can be situated as shown at 164 to indicate to the oncoming vehicle whether to proceed or stop, and an above ground pan-tilt-zoom (PTZ) camera 165 can be provided atop a tent or other structure covering the scanner component to allow an overview of the gatepost 166 and entry area, as well as to inspect the inside of the vehicle trunk, the back of a truck, and similar areas from the rear of a vehicle.

The gatepost 166 can comprise a pan-tilt-zoom (PTZ) camera, a hands-free two-way communication system and an interchangeable cross-match finger print reader/finger print reader and ID scanner (capable of reading magnetic stripe and/or bar code), all mounted on an actuator that can be remotely raised and lowered (e.g., thirty inches or more) atop a pedestal base. In one embodiment, the gatepost camera can have, for example, 22× optical zoom and 10× digital zoom, and the pedestal base can be forty-two inches tall. The communication system can have multiple pre-programmed messages stored in multiple languages, including messages such as "open windows,", "open trunk," "pull on hand brake," "keep hands in clear view," and so forth. In one embodiment of the present invention, the gatepost 166 can be connected either by CAT5E (Ethernet) cabling up to 300 feet or more, or by ruggedized (multi mode) fiber optics cable up to 10,000 feet to the system monitor as indicated at 167. Such cabling can also be provided to connect the scanner component and other components to the monitor. A second traffic light 168, separate electronic message board 169 and an optional light curtain (not shown) can also be employed at the entry way into the restricted access area as part of the gatepost employed with the present invention.

An operator using the monitor described above can thereby: verify whether a driver/passenger and their vehicle are authorized to enter a facility; inspect via ID scanner a driver/passenger's credentials (ID card, etc.); inspect the inside of a vehicle in much greater detail, including the vehicle's trunk and the back of a truck; inspect the vehicle undercarriage and automatically identify any foreign objects or alterations to standard vehicle configurations as described previously; verify the make and model of a vehicle against an authorized vehicle description; communicate with the driver/passenger via the hands free communication device; and control the various other devices such as the auto spikes, traffic lights, electronic message board, and so forth.

Additionally, the operator can automatically record all vehicle and driver/passenger activity, place vehicles, drivers and passengers on watch lists and set up monitoring reports and alerts. If the vehicle is determined to be approved for access, the second traffic light can be turned to green at which time the vehicle can enter in one direction as shown. If the vehicle is denied access, the vehicle will be directed to the first right before the entry way as shown in FIG. 10.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A method for establishing records for use in analyzing the underside of a vehicle, comprising the steps of:
    recording one or more images of the underside of one or more vehicles using a scanner camera configuration comprising a camera adapted to record simultaneous or near-simultaneous images of a vehicle underside from different angles, wherein the scanner camera configuration further comprises a scanner framework having a front end, a back end and a top surface, a first mirror arrangement secured to the framework so as to provide a first reflecting surface angled upwardly toward the to surface and toward the framework front end, and a second mirror arrangement secured to the framework so as to provide a second reflecting surface angled upwardly in a direction facing the framework top surface and the framework back end;
    categorizing the one or more images according to the vehicle year, make, model and transmission type; and
    storing the one or more images in a computer database.

2. The method of claim 1 wherein the camera has a lens and is secured to the framework such that a portion of the lens faces the first mirror arrangement and a portion of the lens faces the second mirror arrangement.

3. A method for establishing records for use in analyzing the underside of a vehicle, comprising the steps of:
    recording one or more images of the underside of one or more vehicles using a scanner camera configuration comprising a camera adapted to record simultaneous or near-simultaneous images of a vehicle underside from different angles, wherein the scanner camera configuration further comprises a scanner framework having a front end, a back end and a top surface, and further wherein the camera is secured such that the camera lens is angled downwardly away from the framework top surface;

categorizing the one or more images according to the vehicle year, make, model and transmission type; and storing the one or more images in a computer database.

4. A method for establishing records for use in analyzing the underside of a vehicle, comprising the steps of:

recording one or more images of the underside of one or more vehicles using a scanner camera configuration comprising a camera adapted to record simultaneous or near-simultaneous images of a vehicle underside from different angles, wherein the scanner camera configuration further comprises a scanner framework having a front end, a back end and a top surface, and further wherein the camera is secured to the framework such that the lens faces the framework back end;

categorizing the one or more images according to the vehicle year, make, model and transmission type; and storing the one or more images in a computer database.

* * * * *